Sept. 19, 1967  D. SZYMANSKI  3,342,165

SUSPENDED DUMPING FEED DISTRIBUTER APPARATUS

Filed May 28, 1965  2 Sheets-Sheet 1

INVENTOR.
DAMON SZYMANSKI
BY
James E. Nilles
ATTORNEY

Sept. 19, 1967          D. SZYMANSKI          3,342,165

SUSPENDED DUMPING FEED DISTRIBUTER APPARATUS

Filed May 28, 1965          2 Sheets-Sheet 2

INVENTOR.
DAMON SZYMANSKI
BY
James E. Nilles
ATTORNEY

United States Patent Office 3,342,165
Patented Sept. 19, 1967

3,342,165
SUSPENDED DUMPING FEED DISTRIBUTER APPARATUS
Damon Szymanski, Rte. 3, Pulaski, Wis. 54162
Filed May 28, 1965, Ser. No. 459,549
4 Claims. (Cl. 119—56)

ABSTRACT OF THE DISCLOSURE

A conveyor for feeding livestock in a barn which includes an elongated platform that moves the length of the barn on overhead tracks and receives material from a stockpile along its length as it moves beneath the stockpile outlet. The conveyor then is tipped along its length so as to deposit the material evenly adjacent the cattle stalls. The device includes a wind up shaft mounted directly on the conveyor and is connected to the tiltable bottom by cables which wind around the shaft when the latter is rotated.

---

This invention relates to a conveyor which finds particular utility for use in feeding livestock in barns or the like.

In accordance with the present invention an animal feed conveyor is provided for a barn, which conveyor is located up out of the way and takes up no room adjacent the animals. In addition, the present conveyor has a great capacity, is rapid in operation and yet requires only a small amount of power for its operation.

These and other objects and advantages of the present invention will appear as this disclosure progresses, reference being had to the accompanying drawings, in which.

Figure 1:
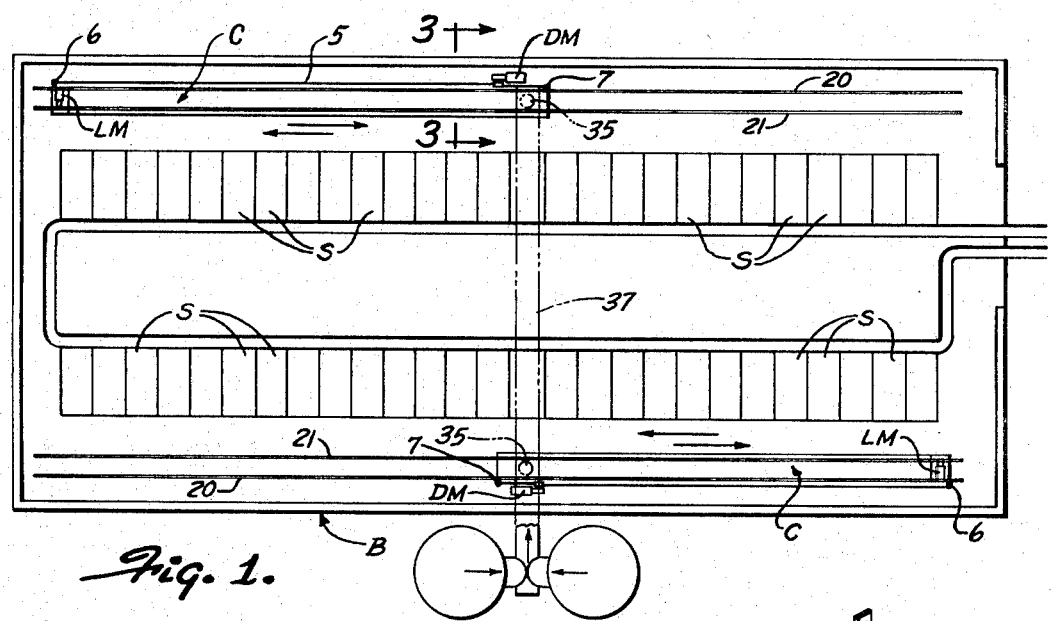
FIGURE 1 is a plan view of the barn showing a conveyor made in accordance with the present invention installed along each side of the interior of the barn.

Referring in greater detail to the drawings, a conveyor C made in accordance with the present invention is shown for illustrative purposes in FIGURE 1 as being installed along each inner side of a barn B. As both of these conveyors are similar, only one will be described in detail. Each conveyor services the cattle stalls S along its respective side of the barn and each conveyor is a length approximately one-half of that of the interior of the barn.

The general organization is that a conveyor driving motor DM is fixed to the barn ceiling member 1 by means of hangers 2 and brackets 3. One such motor is provided for each conveyor and is located generally centrally of the length of the barn. The motor drives a drum 4 around which is wrapped a cable 5. The cable is then anchored at its ends to opposite ends of the conveyor, such as at 6 and 7.

Figure 4:
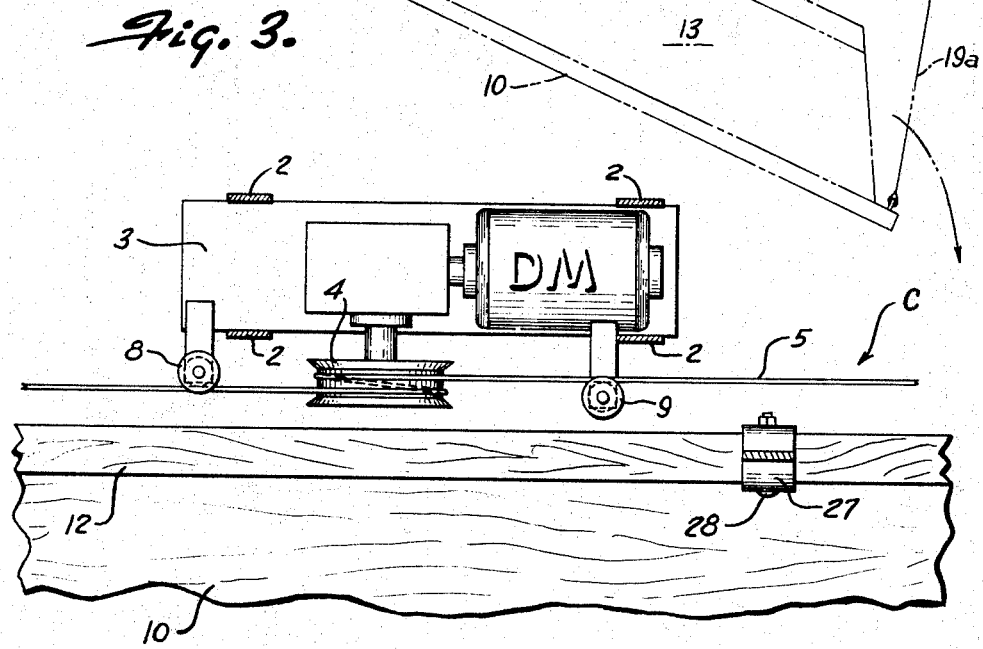
FIGURE 4 is a plan view of the conveyor drive motor, the view being taken along line 4—4 in FIGURE 3.

As shown in FIGURE 4, a pair of idler pulleys 8 and 9 are mounted on the motor support bracket 3 and act against the cable on opposite side of drum 4 to prevent the cable from rubbing against itself on the drive drum 4 which would result in excessive wear.

The conveyor C comprises a long pan 10 which, as previously indicated, is approximately one-half the length of the interior of the barn. This pan can be suitably fabricated from plywood and has hinges 11 along one side for attachment to a frame member 12 fabricated from 2 x 6 lumber, for example. Frame member 12 forms a back wall and is generally co-extensive in length with the pan. Feed deflectors 13 are secured by nails 14 or the like to the top side of the pan. The top edge of these deflectors 13 are beveled as at 15 to prevent accumulation and catching of feed thereon, as will appear. Additionally, the end of these deflectors 13 is cut at an angle, as at 15a to prevent interference with the adjacent lift cable to be presently mentioned. These deflectors serve to prevent feed from catching on and hanging up and accumulating behind the lift cables.

Figure 2:
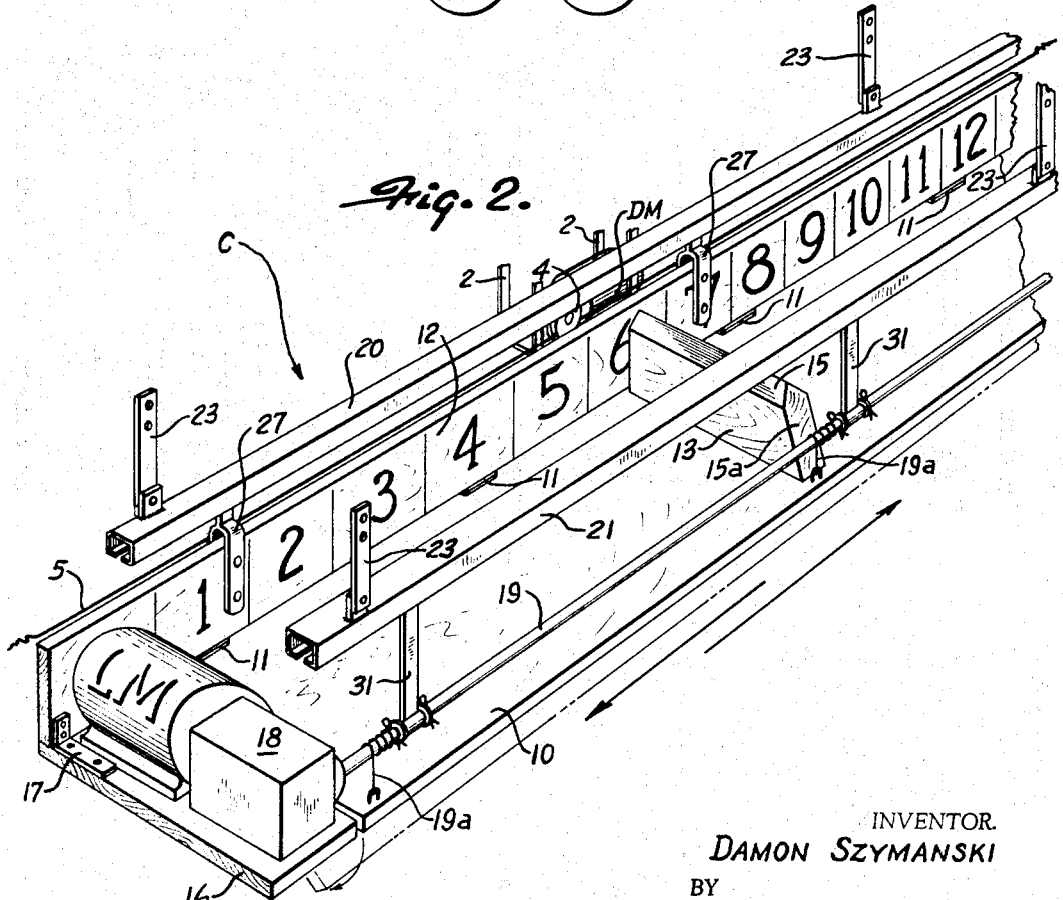
FIGURE 2 is a fragmentary perspective view of one end of one of the conveyors shown in FIGURE 1, but on an enlarged scale.

Large numbers are painted along back wall 12, as shown in FIGURE 2, which are clearly visible from a distance of, for example, 40 to 50 feet, for purposes which will appear later. These numbers are about four feet apart—about the same width as the cattle stalls.

At one end of the conveyor is mounted the pan lifting motor LM which is rigidly fastened by shelf 16 and brace 17 to the back wall 12. This electric motor drives a reduction unit 18 which in turn drives a shaft 19 that extends for the length of the conveyor pan. Flexible lifting cables 19a are fixed at one end to the pan and at the other to the shaft 19, and are located at spaced locations along the length thereof.

The conveyor is mounted for movement from one end of the barn to the other for dumping feed along either half of the barn adjacent the front end of the stalls S, as follows.

A pair of guide rails or tracks 20 and 21 are fixed to the barn ceiling members 22 by means of the hangers 23 and are arranged in parallelism and extend along the entire length of the interior of the barn (FIGURE 1), one along each side of the conveyor.

The tracks are formed of extruded metal, generally square in cross-section and having a slot 25 in their lower side.

The conveyor has a series of hangers 27 fixed by bolt means 28 along one side and extending upwardly where they have a pair of wheels 29 journalled at the upper end of the hangers, the lifting shaft 19 is journalled for rotation in the lower end of hangers 31 and cotter pins 31a or the like extend through the shaft on each side of the hanger to keep the hangers from shifting along the shaft. The hangers also terminate at their upper end in a pair of rollers or wheels 32. Wheels 29 and 32 are mounted in tracks 20 and 21, respectively, and in this manner the entire conveyor travels along beneath the guide tracks 20 and 21.

The feed, such as corn silage, grass silage, chopped hay or other ensilaged forages with which the invention finds great utility, is loaded or dumped onto the conveyor from a chute 35 (FIGURE 3) located above it and centrally along the barn length. The feed is fed into the chute in any suitable manner above, such as by a mechanical conveyor 37 indicated generally schematically in FIGURE 1.

In operation, the conveyor would be in the raised or horizontal position and is moved along under the chute by the rotation of the drive motor DM in one direction or the other. As the conveyor moves under the chute, the feed falls down onto the conveyor so as to load the entire length of the conveyor. There is no need to push the feed along the conveyor itself, and loading thereof is rapid.

Figure 3:
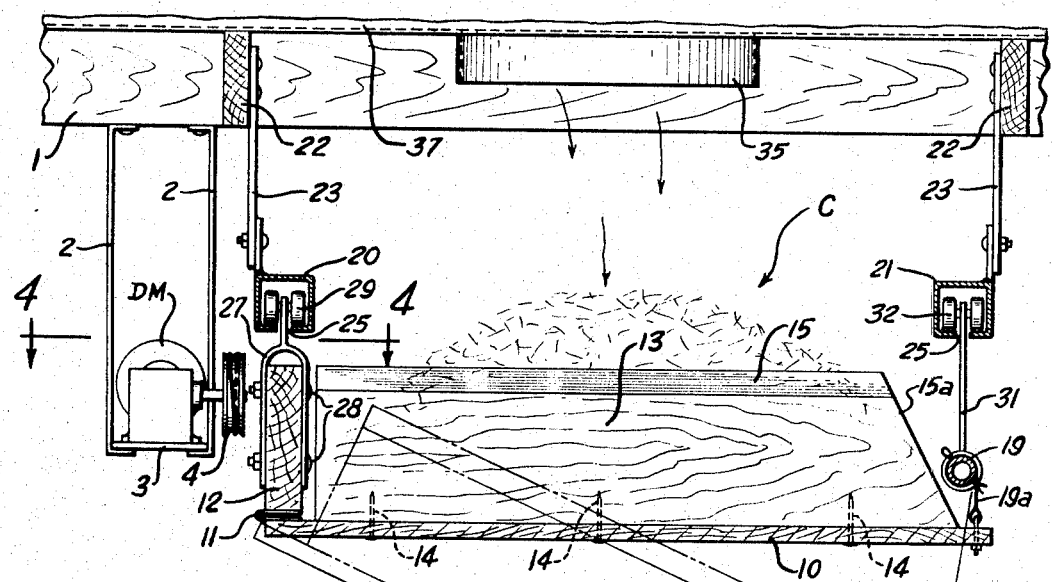
FIGURE 3 is a transverse, sectional view through the conveyor, the view being taken generally along line 3—3 in FIGURE 1 but on an enlarged scale.

When the conveyor then reaches the end of the barn, motor LM is turned on and the shaft 19 turns, permitting the cables 19a to unwind and the pan to fall to the feed dumping position shown in broken lines in FIGURE 3. The feed dumps completely and instantaneously along one-half of the entire length of the barn and adjacent the heads of the cattle (not shown).

The electric motor LM is then turned on to rotate shaft 19 and raise the pan to the loading position. The motor DM then drives the conveyor to the other end of the barn and while doing so the conveyor is again loaded from chute 35.

Referring again to the large numbers painted on the back wall 12, these correspond to the stalls in which particular animals having certain feed requirements or amounts are located. Thus the operator can stop the conveyor for a desired time while a certain number is below the feed chute so that the proper amount of feed can be loaded on the conveyor for the particular animal represented by that number. In this manner individual control of feeding certain animals is provided.

A particularly efficient and quick acting conveyor is thus provided by the present invention.

Various modes of carrying out the invention are contemplated as being within the scope of the following claims particularly pointing out and distinctly claiming the subject mater which is regarded as the invention.

I claim:
1. A conveyor comprising, a pair of overhead tracks in parallel relationship, an elongated feed conveyor located beneath and parallel to said tracks and comprising a frame member, an elongated pan hinged along one side to said member for swinging between a horizontal position and a downwardly inclined position, a rotatable shaft carried by the conveyor and along the opposite side of and above said pan, flexible means fixed to said shaft and to said pan, motor means carried by said conveyor for rotating said shaft and consequently winding said flexible means therearound to raise said pan from said inclined to said horizontal position, hanger means connected to said conveyor and having wheels at their upper ends for supporting engagement with said tracks, and second motor means for driving said conveyor along said tracks.

2. Feed conveyor mechanism for use in a barn and comprising, a pair of overhead track means including means for supporting them in parallel relationship along the length of said barn, an elongated feed conveyor located directly beneath and being approximately one-half the length of the interior of said barn, said conveyor comprising a frame member, an elongated pan hinged along one side to said member for swinging between a horizontal conveying position and a downwardly inclined dumping position, a rotatable shaft carried by the conveyor and located along the opposite side of and above said pan, flexible means fixed to said shaft and to said pan, motor means carried by said conveyor for rotating said shaft and consequently winding up said flexible means to raise said pan from said dumping position to said horizontal position, hanger means between said frame member and said track means, other hanger means between said shaft and said track means, said hanger means having wheels at their upper ends for supporting engagement with and support by said track means, and second motor means for driving said conveyor along said tracks.

3. A feed conveyor for use in a barn or the like and comprising, a pair of overhead tracks, means for hanging said tracks in parallel relationship along the length of said barn, an elongated feed conveyor extending lengthwise in said barn and located beneath and parallel to said tracks, said conveyor being approximately one-half the length of the interior of said barn and comprising a frame member along the length of said conveyor, an elongated pan hinged along one side to said member for swinging between a horizontal feed conveying position and a downwardly inclined, feed dumping position, a rotatable shaft carried by the conveyor and along the opposite side of and above said pan, flexible means fixed to said shaft and to said pan, motor means carried by said conveyor for rotating said shaft and consequently winding said flexible means therearound to raise said pan from said dumping position to said horizontal position, hanger means between said frame member and one of said tracks, other hanger means between said shaft and the other of said tracks, said hanger means having wheels at their upper ends for supporting engagement with said tracks, and second motor means for driving said conveyor along said tracks.

4. A feed conveyor for use in a barn or the like and comprising, a pair of overhead tracks, means for hanging said tracks in parallel relationship along the length of said barn, an elongated feed conveyor extending lengthwise in said barn and located beneath and parallel to said tracks, said conveyor being approximately one-half the length of the interior of said barn and comprising a frame member along the length of said conveyor, an elongated pan hinged along one side to said member for swinging between a horizontal feed conveying position and a downwardly inclined, feed dumping position, a rotatable shaft carried by the conveyor and along the opposite side of and above said pan, flexible means fixed at their upper ends to said shaft and at their lower ends to said pan, motor means carried by said conveyor and having a drive connection to said shaft for rotating said shaft and consequently winding said flexible means therearound to raise said pan from said dumping position to said horizontal position, hanger means secured at their lower end to said frame member and one having wheel means at their upper end for supporting engagement with one of said tracks, other hanger means at their lower ends rotatably supporting said shaft and having wheel means at their upper ends for engagement with the other of said tracks, and second motor means having means for being fixed in said barn approximately mid-length thereof and adjacent said conveyor, and a cable connection between said second motor means and said conveyor for driving said conveyor along said tracks.

References Cited

UNITED STATES PATENTS

| | | | |
|---|---|---|---|
| 886,891 | 5/1908 | Straight | 105—242 |
| 3,123,050 | 3/1964 | Haen | 119—56 X |
| 3,240,323 | 3/1966 | Kitson | 198—224 |
| 3,252,444 | 5/1966 | Haen | 119—52 |

ARTHUR L. LA POINT, *Primary Examiner.*

H. BELTRAN, *Examiner.*